US007603451B2

(12) United States Patent
Matsumoto (10) Patent No.: US 7,603,451 B2
(45) Date of Patent: Oct. 13, 2009

(54) NETWORK SYSTEM THAT CONNECTS A NETWORK TERMINAL TO ANOTHER NETWORK TERMINAL HAVING A DIFFERENT PROTOCOL

(75) Inventor: Hideto Matsumoto, Nagoya-shi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 611 days.

(21) Appl. No.: 10/227,250

(22) Filed: Aug. 26, 2002

(65) Prior Publication Data

US 2003/0041140 A1    Feb. 27, 2003

(30) Foreign Application Priority Data

Aug. 27, 2001   (JP)   ............... 2001-256684

(51) Int. Cl.
*G06F 15/173*   (2006.01)
*G06F 15/177*   (2006.01)

(52) U.S. Cl. .................. 709/223; 709/220; 709/221

(58) Field of Classification Search ......... 709/217–221, 709/223–225; 726/11–12
See application file for complete search history.

(56) References Cited

U.S. PATENT DOCUMENTS

| 6,009,274 | A | * | 12/1999 | Fletcher et al. | ............. | 717/173 |
| 6,112,256 | A | * | 8/2000 | Goffinet et al. | ................. | 710/8 |
| 6,145,001 | A | * | 11/2000 | Scholl et al. | ................. | 709/223 |
| 6,185,600 | B1 | * | 2/2001 | Spence et al. | ................ | 709/203 |
| 6,314,476 | B1 | * | 11/2001 | Ohara | .......................... | 710/15 |
| 6,324,577 | B1 | * | 11/2001 | Hirai | ........................... | 709/223 |
| 6,363,421 | B2 | * | 3/2002 | Barker et al. | ................. | 709/223 |
| 6,389,464 | B1 | * | 5/2002 | Krishnamurthy et al. | .... | 709/220 |
| 6,526,442 | B1 | * | 2/2003 | Stupek et al. | ............... | 709/224 |
| 6,694,376 | B1 | * | 2/2004 | Ohara | ......................... | 709/250 |
| 6,920,506 | B2 | * | 7/2005 | Barnard et al. | .............. | 709/245 |
| 6,947,156 | B1 | * | 9/2005 | Jeyachandran et al. | ..... | 358/1.15 |
| 6,985,947 | B1 | * | 1/2006 | Gbadegesin | ................. | 709/225 |
| 7,020,720 | B1 | * | 3/2006 | Donahue et al. | ............ | 709/245 |
| 7,272,650 | B2 | * | 9/2007 | Elgebaly et al. | ............. | 709/227 |
| 2003/0005097 | A1 | * | 1/2003 | Barnard et al. | .............. | 709/223 |

FOREIGN PATENT DOCUMENTS

| JP | A-10-240657 | 9/1998 |
| JP | A-10-254804 | 9/1998 |
| JP | A-11298500 | 10/1999 |

OTHER PUBLICATIONS

U.S. Appl. No. 09/231,114, filed Jan. 14, 1999, Funahashi.

* cited by examiner

*Primary Examiner*—Aaron Strange
(74) *Attorney, Agent, or Firm*—Oliff & Berridge, PLC (57) ABSTRACT

A network system is disclosed, including a plurality of network terminals connected to a network; and an administrator terminal that manages the network terminals across the network. One of the network terminals includes a command receiver that receives a command from the administrator terminal over the network, and a command transmitter that transits the command received by the command receiver to another of the plurality of network terminals. When the administrator terminal is allowed to communicate with only particular terminals, the network system allows the administrator terminal to transmit a command to terminals other than the particular terminals indirectly. Therefore, the network system enjoys enhanced advantages.

10 Claims, 9 Drawing Sheets

NETWORK SYSTEM THAT CONNECTS A NETWORK TERMINAL TO ANOTHER NETWORK TERMINAL HAVING A DIFFERENT PROTOCOL

BACKGROUND OF THE INVENTION

1. Field of the Invention

The present invention relates to a network system that includes a plurality of network terminals connected to the network and an administrator device for managing each of the network terminals through the network. This invention also relates to a network terminal constituting the network, a program for operating the network terminal, and a recording medium for storing the program.

Generally, a network system is well-known including a plurality of printers and a single administrator computer for controlling the printers. In this system, the single computer centrally manages the operations of the printers and troubles. This configuration allows efficient solving of printer problems. When one of the printers does not operate, the computer allows another printer to operate instead of the problematic printer.

For security reasons, it may be undesirable to enable the administration computer to transmit any command to all the printers on the network. In this case, a gateway or firewall is provided between the network and the administration computer for preventing the administrator computer from transmitting commands to all the printers.

Some of the printers connected to the network receive commands in only a particular protocol, because they are not connected to a WEB server. For example, if the administration computer transmits a command in Hyper Text Transfer Protocol (HTTP), a printer having no WEB server may not receive the HTTP command. Instead the printer may receive a command in Simple Network Management Protocol (SNMP). In such a case, the administrator device transmits commands to only some particular printers.

The advantages of the network system substantially decrease when the administrator device is allowed to transmit commands to only a few terminals. Japanese Patent Publication No. 11-203087 discloses a network system comprising a terminal connected to a network, wherein the terminal collects information about other terminals, and then transmits the information to an administrator device. However, in the above system, commands must be sent directly to a target terminal. In other words, because the administrator device is controlled to send the commands to only a particular terminal, the advantages of the system is substantially reduced.

It is an object of the present invention to provide a network system including a plurality of network terminals connected to a network and an administrator terminal that controls the terminals through the network, wherein a command can be transmitted indirectly from the administrator device to all the terminals even when the administrator terminal is allowed to transmit a command to only some particular network terminals.

SUMMARY OF THE INVENTION

The above and other objects and advantages of the present invention will become apparent as the description proceeds.

The present invention is directed to a network system comprising: a plurality of network terminals connected to a network; and an administrator terminal that manages the network terminals across the network. One of the plurality of network terminals includes: a command receiver that receives a command from the administrator terminal over the network; and a command transmitter that transits the command received by the command receiver to another of the plurality of network terminals.

In the above network system, the command relates to settings of the another of the plurality of network terminals. Alternatively the command sets an IP address of the another of the plurality of network terminals to a predetermined value.

The network system of the present invention further includes a gateway provided between the network and the administrator terminal for restricting transmission of a command from the administrator terminal to one of the plurality of network terminals depending on an IP address of the one of the plurality of network terminals.

In the above network system, the one of the plurality of network terminals includes a protocol changing unit that changes protocol defining the command. If the protocol of the command received by the command receiver is not supported by the another of the plurality of network terminals, the protocol changing unit changes the protocol of the command to a different protocol that supports the another of the plurality of network terminals, and the command transmitter then transmits the command in the different protocol to the another of the plurality of network terminals.

The present invention is directed to a network terminal connected to other network terminals through a network, the network terminal comprising: a command receiver that receives a command over the network; and a command transmitter that transmits the command received by the command receiver to another network terminal connected to the network.

In the above network terminal, the command relates to settings of the another network terminal. Alternatively, the command sets an IP address of the another network terminal to a predetermined value.

The network terminal further includes a protocol changing unit that changes a protocol of the command. If the protocol of the command received by the command receiver is not supported by the another network terminal, the protocol changing unit changes the protocol of the command to a different protocol that supports the another network terminal, and the command transmitter then transmits the command in the different protocol to the another terminal.

The present invention is directed to a method for managing network terminals connected to a network by an administrator terminal. The method includes the steps of: receiving a command that controls one of the plurality of network terminals at another of the plurality of network terminals; and transmitting the command received by the another of the plurality of network terminals to the one of the plurality of network terminals.

In the method, the command relates to settings of the one of the plurality of network terminals. Alternatively, the command sets an IP address of the one of the plurality of network terminals to a predetermined value.

The method further includes the step of: restricting transmission of a command from the administrator terminal to the one of the plurality of network terminals depending on an IP address of the one of the plurality of network terminals.

The method as claimed in claim 10 further includes the steps of: changing protocol defining the command to a different protocol supporting the one of the plurality of network terminals, and transmitting the command in the changed protocol to the one of the plurality of network terminals.

The present invention is directed to a method for controlling network terminals connected to a network. The method includes the steps of: receiving a command over the network at the one of the plurality of network terminals; and transmitting the received command to another of the plurality of network terminal.

In the method, the command relates to settings of the another of the plurality of network terminals. Alternatively, the command sets an IP address of the another of the plurality of network terminals to a predetermined value.

The method further includes the steps of: changing a protocol of the command to a different protocol supporting the another of the plurality of network terminals, and transmitting the command in the different protocol to the another of the plurality of network terminals.

The present invention is directed to a program for managing network terminals connected to a network by an administrator terminal. The program includes: a program for receiving a command that controls one of the plurality of network terminals at another of the plurality of network terminals; and a program for transmitting the command received by the another of the plurality of network terminals to the one of the plurality of network terminals.

As to the program, the command relates to settings of the one of the plurality of network terminals.

As to the program, the command sets an IP address of the one of the plurality of network terminals to a predetermined value.

The program further includes a program for restricting transmission of a command from the administrator terminal to the one of the plurality of network terminals depending on an IP address of the one of the plurality of network terminals.

The program further includes: a program for changing protocol defining the command to a different protocol supporting the one of the plurality of network terminals, and a program for transmitting the command in the changed protocol to the one of the plurality of network terminals.

The present invention is directed to a program for controlling network terminals through a network, comprising: a program for receiving a command over the network at the one of the plurality of network terminals; and a program for transmitting the received command to another of the plurality of network terminal.

As to the program, the command relates to settings of the another of the plurality of network terminals.

As to the program, the command sets an IP address of the another of the plurality of network terminals to a predetermined value.

The program further includes: a program for changing a protocol of the command to a different protocol supporting the another of the plurality of network terminals, and a program for transmitting the command in the different protocol to the another of the plurality of network terminals.

BRIEF DESCRIPTION OF THE DRAWINGS

The above and other objects, features and advantages of the invention will become more apparent from reading the following description of the embodiment taken in connection with the accompanying drawings in which.

DETAILED DESCRIPTION OF THE EMBODIMENT

Next, a network system of an embodiment according to the present invention will be described referring to the attached drawings. The network system described in the embodiment is controlled by the World wide Web (WWW). On the Web, everything is represented as hypertext (in HTML format) and is linked to any documents by their URLs.

First, a brief explanation will be provided for the WWW. The WWW is an information system for allowing a computer to manage network administration information about terminals connected to the computer through a network, such as printers, in a unified manner. The computer is referred to as a browser computer installed with a WWW browser The browser is an application for viewing setting of each of the terminals in turn. Thus, the browsing computer browses the conditions of the terminals and keeps track of them, thereby managing the network. The browser computer uses an application, called hypertext, to represent graphics and textual elements, thereby indicating the conditions of each terminal. Hyper Text Transmission Protocol (HTTP) is used for transmitting information between the browser computer and the terminals. Hyper Text Markup Language (HTML) is used as a language for presenting the hyper text.

In this embodiment, each terminal is installed with a Common Gateway Interface (CGI). The CGI is designed to create HTML commanded by the browser computer. The CGI is also designed to interpreting information data transmitted from the browser computer to a server computer. It should be noted that the server computer is provided with a Network Interface Card (NIC) for providing data or control information to printers connected to the NIC, and that the server computer is installed with the CGI for the NIC. It also should be noted that the information transmitted from the browser computer to the server computer is generally referred to a form. For example, the form, "COPIES=5, " is transmitted from the browsing computer to the CGI in the server computer, when a user sets 5 copies of documents being printed by a printer to the browsing computer.

In this embodiment, the browser computer designates the terminal by using an address information called Uniform Resource Locator (URL). The URL is identifying information for each terminal. In this embodiment, the NIC has a different URL from that of the printer connected to the NIC.

Figure 1:
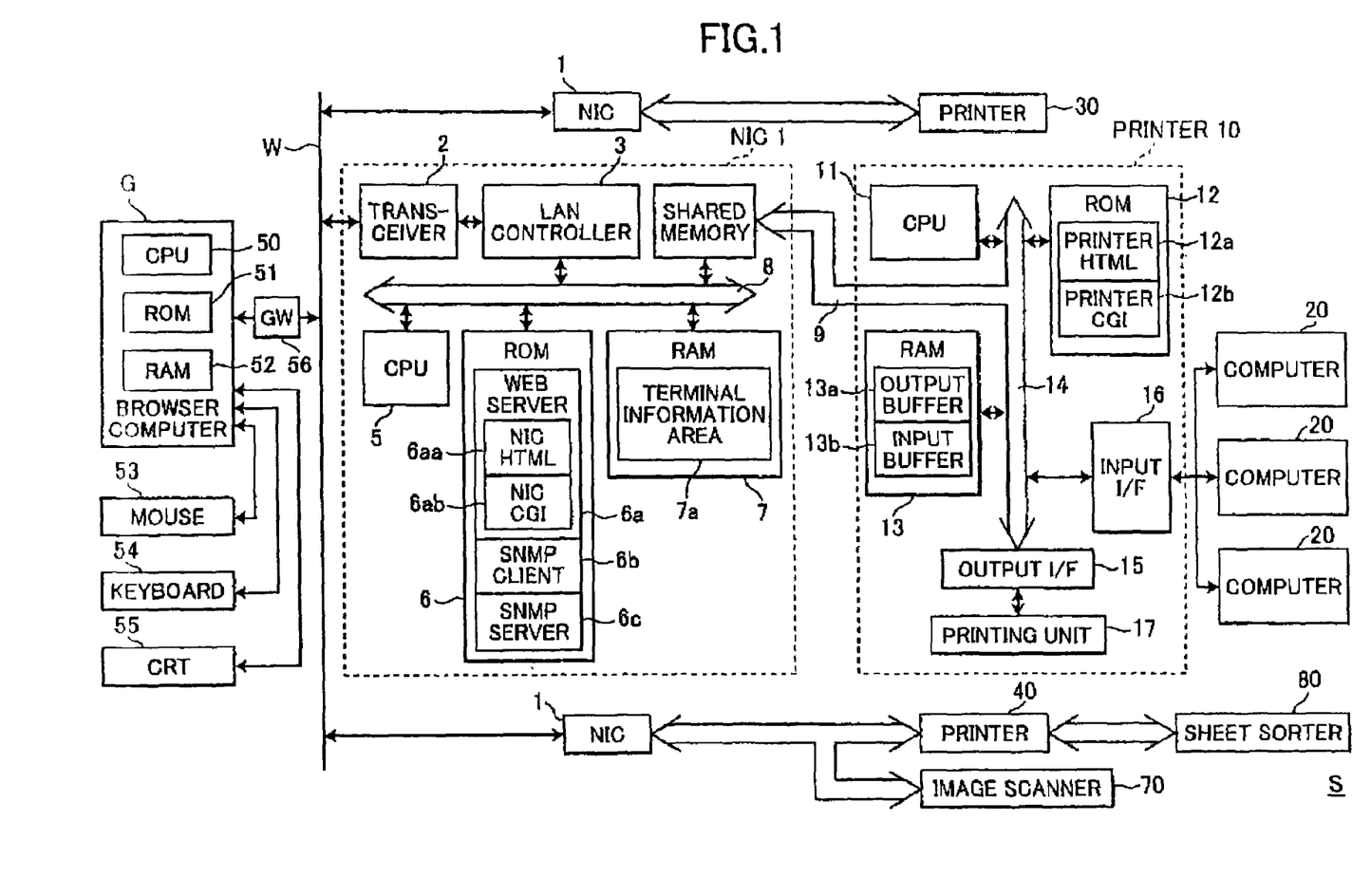
FIG. 1 is a block diagram showing a network system of one embodiment according to the present invention.

Next, an explanation will be provided a network system S according to the present embodiment referring to FIG. 1.

As shown in FIG. 1, the network system S includes a browser computer G connected to a network W such as a telephone network or a local area network (LAN), and a plurality of printers 10, 30, 40. Each of the printers 10, 30, 40 is connected to the network W through the corresponding one of NICs 1, 130, 140. The printer 10 is connected to a plurality of computers 20. The printer 40 is connected to the sheet sorter 80. An image scanner 70 is connected to the NIC 140 of the printer 40. In this embodiment, the printers 10, 30, and 40 may be different types from each other.

The browser computer G includes a central processing unit (CPU) 50, a read only memory (ROM) 51, and a random access memory (RAM) 52. The browser computer G also includes a mouse 53, a key board 54, and a cathode ray tube (CRT) 55. The browser computer G is connected to a network W through a gateway 56. The browser computer G is configured to only communicate with a terminal having a particular IP address. The gateway 56 enables the browser computer G to communicate with the printer 10.

The NIC includes a transceiver 2, a LAN controller 3, a shared memory 4, a CPU 5, a ROM 6, a RAM 7, and a bus 8. The bus 8 is connected to the transceiver 2, the LAN control 3, the shared memory 4, the CPU 5, the ROM 6, and the RAM 7. The ROM 6 stores a web server program 6a, an SNMP client program 6b, and an SNMP server program 6c.

It is well-known that the web server program 6a includes a NIC HTML 6aa and a NIC CGI 6ab as a database. The web server program 6a functions as a web server in cooperation with the LAN controller 3. The SNMP client program 6b, and the SNMP server program 6c function as an SNMP client and an SNMP server (SNMP agent) in cooperation with the LAN controller 3.

The printer 10 includes a CPU 11, a ROM 12, a RAM 13, an output interface 15, and input interface 16, a bus 14, and a printing unit 17 connected to the output interface 15. The bus 14 is connected to the CPU 11, the ROM 12, the RAM 13, the output and input interfaces 15, 16. The ROM 12 stores an HTML 12a and a CGI 12b for the printer. The RAM 13 also includes an output buffer 13a and an input buffer 13b. It should be noted that the printer 10 is connected to the NIC 1 through a connection line 9 connected to the bus 14. The connection line 9 is provided for connecting the shared memory 4 of the NIC 1 to the bus 14 of the printer 10. The printer 10 is also connected to each of the computers 20 through the input interface 16.

Operations of the network system S will be described referring to FIG. 1. First, communication between the browsing computer G and the printer 10 will be described. The CPU 50 in the browser computer G generates a request for the printer 10, and transmits the request to the transceiver 2 of the NIC 1 connected to the printer 10 across the network W. The request is necessary for the browsing computer G to understand the condition of the printer 10 connected to the NIC 1. The CPU 50 may generate a command for each of the printers 10-40 instead of the request, and transmits it to the corresponding transceivers 2 of the NIC 1 across the network W.

When the NIC 1 receives the request from the browser computer G, the transceiver 2 of the NIC 1 demodulates the request, and sends the demodulated request to the LAN controller 3.

The following are examples of the requests:
1) "GET/nic/****.html HTTP/1.0"
2) "GET/nic-CGI/****.exe HTTP/1.0"
3) "GET/printer/****.html HTTP/1.0"
4) "GET/printer-CGI/****.exe HTTP/1.0"

As to these examples, the expression "GET" indicates a request from the browsing computer. The expressions "nic," "nic-CGI", "printer", and "printer-CGI" are URLS. The sections "**.html" and ".exe" indicate administration subjects. The administration subject is normally referred to as a "resource". The expression "" indicates the name of the resource. The expression "HTTP/1.0" indicates the version of HTTP. Each requests includes either a URL designating NIC 1 such as "nic" or "nic-CGI," or a URL designating the printer 10** such as "printer" and "printer-CGI."

Next, when the NIC 1 receives a request including a URL designating the printer 10, that is, a request including the URL of "printer" or "printer-CGI" as shown in the above examples 3) and 4), the CPU 5 transfers the request through the shared memory 4 and the connection line 9 to the printer 10. At this time, after the request is stored in the shared memory 4, the CPU 5 generates an interrupt command for the CPU 11, and sends the interrupt command to the printer 10 across a signal line (not shown). The CPU5 causes the CPU 11 to process the request. The NIC 1 operates in the substantially same manner when it receives the command. It should be noted that the control programs necessary for the CPU 5 to process the above request the command are stored in the ROM 6.

When the printer 10 receives the request designating the URL of the printer 10 through the connection line 9, the request goes to the CPU 11 across the bus 14. Then the CPU 11 processes the request by using the printer HTML 12a and the printer CGI 12b stored in the ROM 12. At this time, if only the printer HTML can process the request, the request is processed using only the printer HTML 12a. Similarly, if only the printer CGI 12b can process the request, the request is processed by using only the printer CGI 12b. The CPU 11 then sends a response based on the above processes back to the NIC 1 through the bus 14, the connection line 9, and the shared memory 4. A control program required for the CPU 11 to process the request is stored in the ROM 12.

When the NIC 1 receives the response to the request from the printer 10, the NIC 1 transfers the response as-is to the browser computer G over the network W.

When the browser computer G receives the response from the printer 10, the browser computer G displays images or text corresponding to the received response on the CRT 55. The browser computer G then grasps the operating conditions of the NIC 1 and/or the printer 10.

The same type of NIC 1, 130, 140 is provided with each of the printers 10, 30, and 40 in the network system S, though the printers 10, 30, and 40 may be different models from each other. More specially, each of the printers 10, 30, and 40 includes a different type of printer HTML or the printer CGI. In other embodiment, any other different types of printers may be connected to the network W through different types of NICs.

Communication between the printers 30, 40 and the browsing computer G through the printer 10 will be described. The printer 10 receives information about the NIC 1 and the printers 30, 40 and their NICs 130, 140. When the printer 10 receives a predetermined request from the browser computer G, the printer 10 sends a response including information about the printers 30, 40 as well as information about the printer 10 itself to the browser computer G. In addition, when the printer 10 receives a command for the printers 30, 40 from the browser computer G, the printer 10 transfers the command to the printers 30, 40. The details will be explained.

Figure 2:
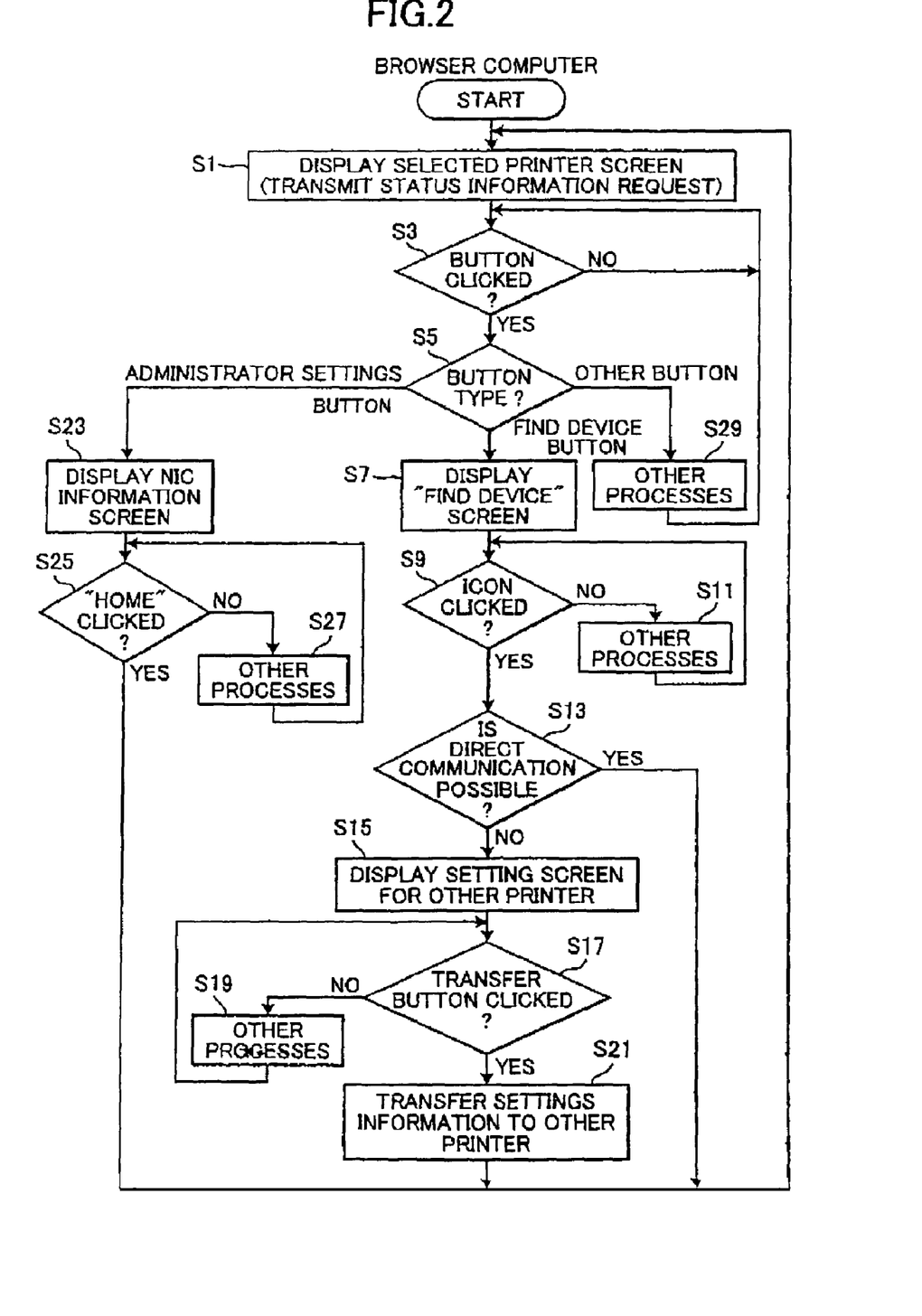
FIG. 2 is a flowchart executed by a browsing computer connected to the network.

The browsing computer G starts the routine shown in FIG. 2, when the browsing computer G receives the IP address of any one of the printers through the keyboard 54. In this embodiment, supposing that the printer 10 is designated by the IF address, in S1, the browsing computer G displays a printer screen 200 related to the printer 10 on the CRT 55. It should be note that the IP address is a string of numbers that identifies a device on the network W.

Figure 5:
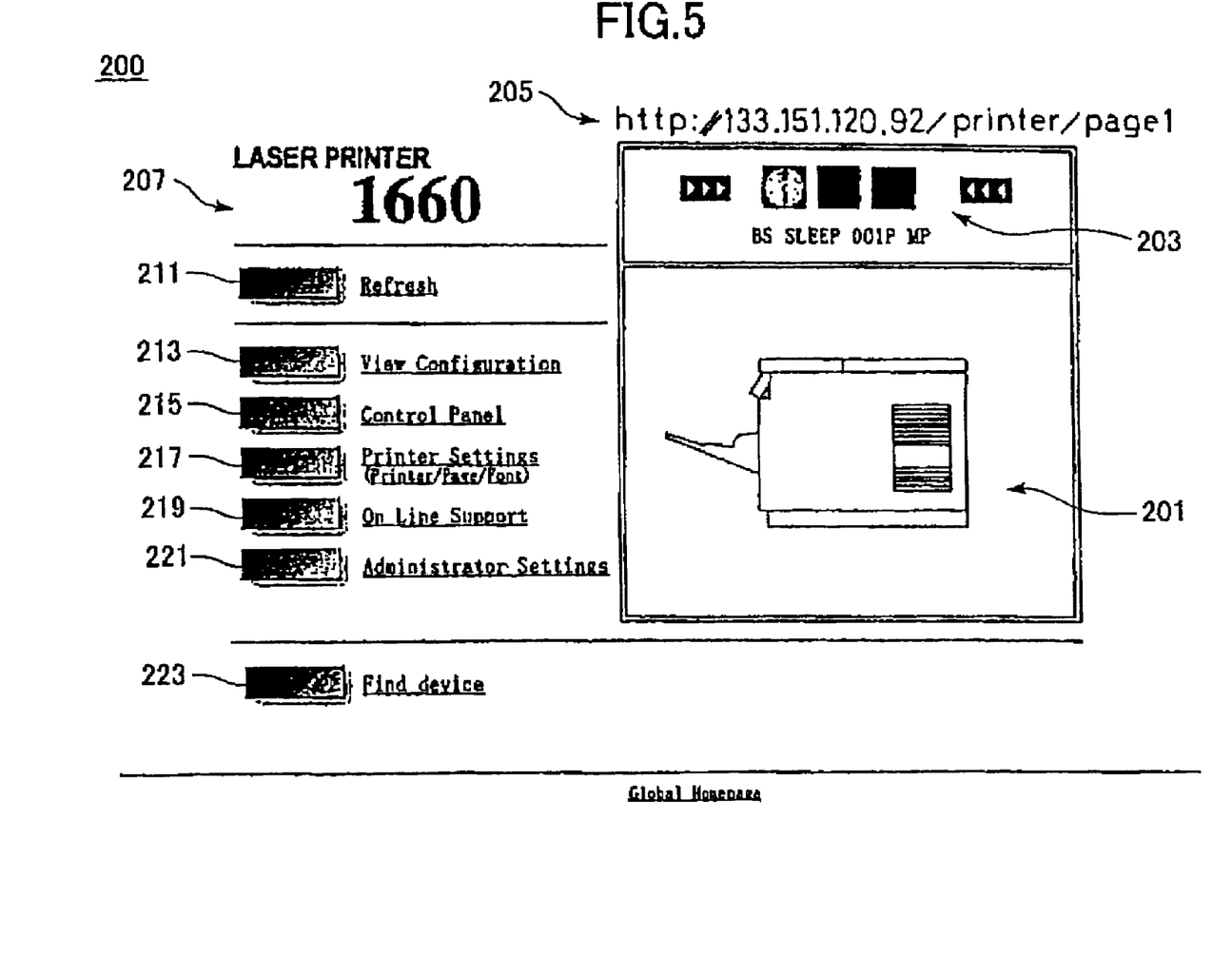
FIG. 5 is a view showing one screen of the browsing computer.

As shown in FIG. 5, the printer screen 200 includes an image view 201 showing a current condition of the displayed printer, a set of pilot lamps 203 showing the condition of the printer with one of red, yellow, and green colors, a URI of the displayed printer 205, and a type of the displayed printer 207. the printer screen 200 also includes a refresh button 211, a view configuration button 213, a control panel button 215, a printer setting button 217, an online support button 219, an administrator setting button 221, and a finding device button 223, any one of which can be clicked by a mouse 53 of the browser computer G.

The refresh button 211 is for instructing the displayed printer to retrieve information about the displayed printer 10. The view configuration button 213 is for indicating information on the version of the displayed printer. The control panel button 215 is for displaying an image of the control panel of the displayed printer on the CRT 55. The control panel button 215 enables remote control of the displayed control panel of the printer. The printer setting button 217 is for establishing settings of the printer 10 from the browser computer G. The online support button 219 is for accessing the web site of the displayed printer-manufacturer and displaying support information about the displayed printer. The administrator setting button 221 is for displaying an NIC information screen. The find device button 223 is for displaying a list of all information on printers connected to the network W.

In S1, the browser computer G transmits a status information request to the printer 10. On the other hand, the printer 10 executes the processes shown in FIG. 3. The printer 10 replies to the status information request as follows.

Figure 3:
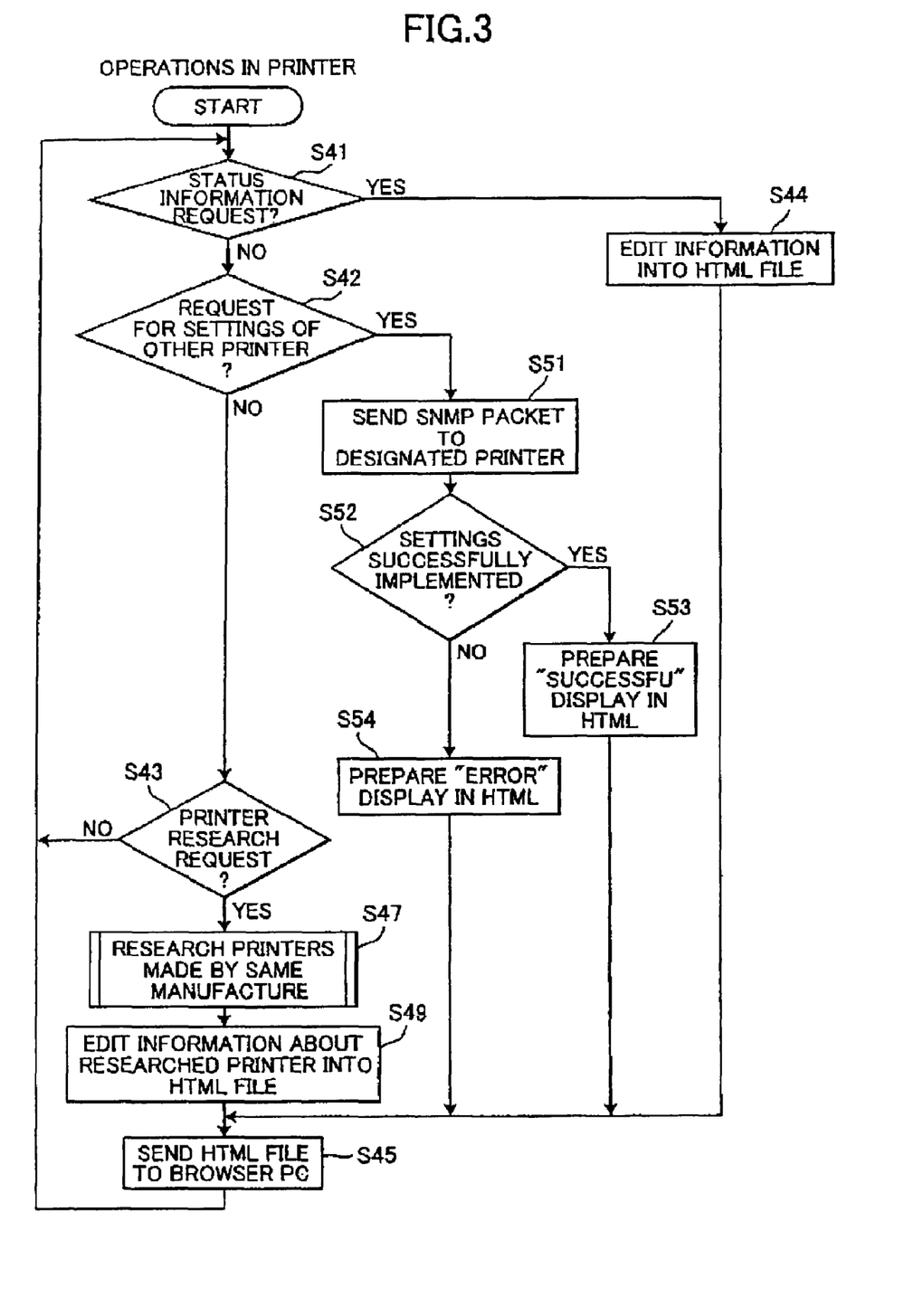
FIG. 3 is a flowchart executed by a printer connected to the network.

As shown in FIG. 3, the printer 10 performs a loop comprising the steps S41, S42, and S43 of: determining whether a status information request is received in S41; whether a request for establishing settings of another printer is received in S42; and whether a printer search request is received in S43. If the status information request is received (S41: YES), then advances to S44. In S44, the printer 10 edits status information associated with the conditions and/or settings of itself into an HTML file. The printer 10 sends the HTML file to the browser computer G in S45, and then returns to S41.

Next, in S1, the browser computer G receives the HTML file including the status information. The browser computer G then displays the printer screen 200 based on the status information as shown in FIG. 5. Next, in S3 it is determined whether one of the buttons on the printer screen 200 is clicked. The program waits until one of the buttons is clicked. If the find device button 223 is clicked, then go to S7 after a type of the button is determined in 55. In S7, a find device screen 300 is displayed as shown in FIG. 6.

Figure 6:
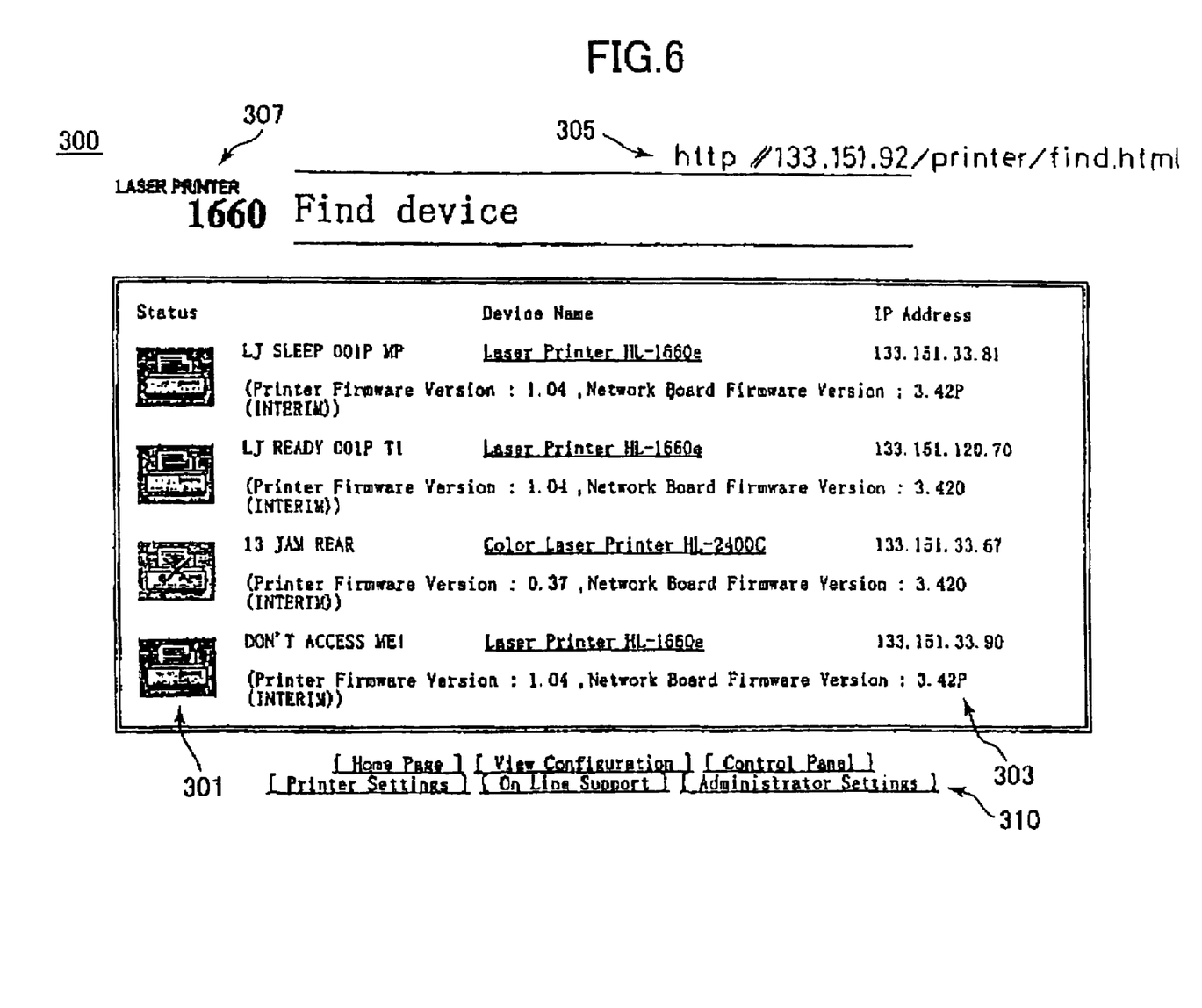
FIG. 6 is a view showing find device screen of the browsing computer.

Referring to FIG. 6, the find device screen 300 displays icons 301 for the printer(s) connected to the network W, information 303 on the connected printer(s), and the URL 305 and model type 307 of the connected printer(s). The find device screen 300 also includes buttons 310 similar to the buttons 211 to 223 of the printer screen 200. The icons 301 has the same colors as those of the pilot lamp 203.

After the find device button is determined to be clicked, the browser computer G sends a printer research request to the printer 10. In response to the request, the printer 10 determines that the printer research request is received in S43 (S43: YES) The printer 10 then goes to S47 to perform a research routine shown by the flowchart in FIG. 4 for determining its own manufacturer.

Figure 4:
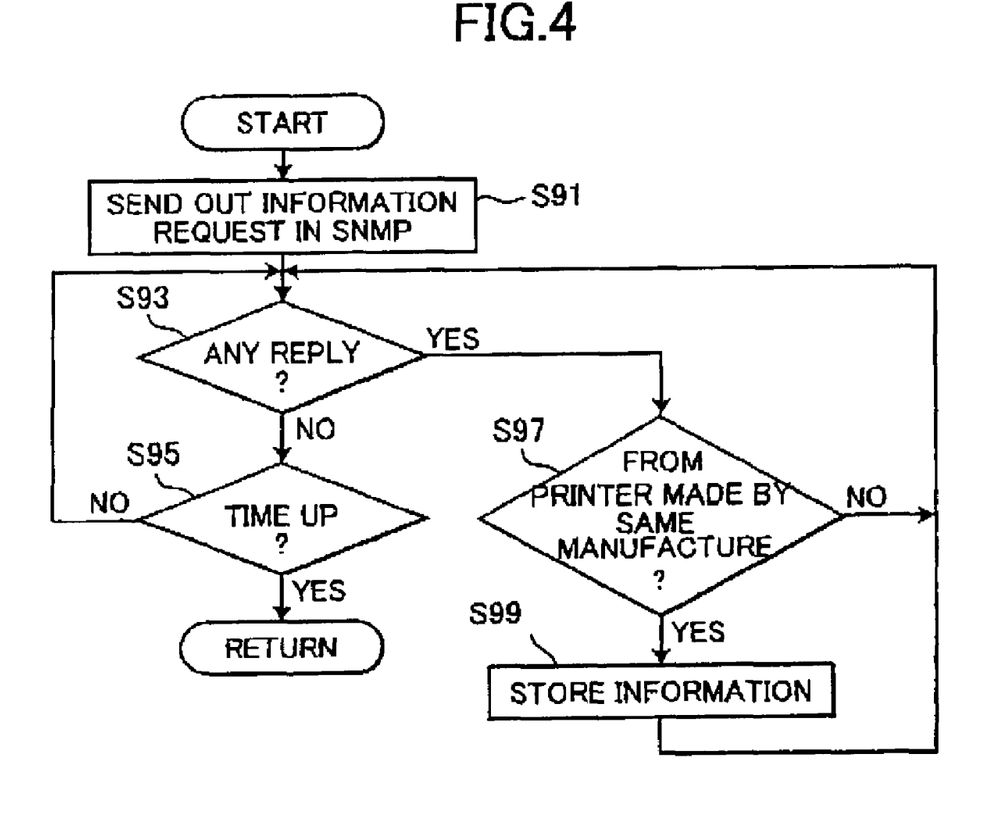
FIG. 4 is a flowchart for researching a printer made by the same manufacture.

Referring to FIG. 4, in S91, the printer 10 sends an information request in SNMP to all the printers 30, 40 connected to the network W. The printer 10 then determines in S93 if the printer 10 receives a response from any one of the printers 30, 40. If no response is received (S93: NO), then go to S95. In S95, it is determined whether a predetermined time duration has elapsed. If the predetermined time duration has not elapsed (S95: NO), then returns to S93. For example, if a response is received from the printer 30(S93: YES), then goes to S97. In S97, it is determined whether the printer 30 sending the response was made by the same manufacturer as that of the printer 10. If the printer 30 is made by a different manufacture from that of the printer 10 (S97: NO), then returns to S93.

Agreement of the printer manufacturers may be determined by inserting a keyword such as the trademark of the manufacturer to both the information request transmitted in S91 and the response in S93 and comparing them to each other. When each of the printers 30, 40 receives the information request, the printer 30, 40 generates a random number. The printer 30, 40 may send its own information to the printer 10 after waiting for several milliseconds corresponding to the random number. For this reason, the printer 10 receives the device information from each of the printers 30, 40 at a different timing dependent on the random number over the network W.

In S97, the printer 10 determines that the printer sending the response was made by the same manufacturer as that of the printer 10 (S97: YES), then goes to S99. In S99, the printer 10 stores the information included in the response into the RAM 13 and returns to S93. When the printer 10 repeats the above processes, until the predetermined time elapses (S95: YES). After the predetermined time has elapsed (595: YES), the printer research routine is finished and the printer 10 then returns to S49 shown in FIG. 3. In S49, the printer 10 edits the printer information stored in S99 during the predetermined time duration into an HTML file. In S45, the printer 10 transmits the HTML file to the browsing computer G. When S45 are completed, the printer 10 returns to the loop processes of S41 to S43.

Referring to FIG., 2 again, in S7, the browser computer G displays the find device screen 300 based on the information received from the printers 30, 40. In S9, the browse computer G determines whether any icon 301 on the find device screen 300 is clicked. The browse computer G waits for a click of the button 301 while processing click of one of the buttons 310 (S11). When any one of the icons 301 is clicked (S9: YES), and the browsing computer G is allowed to communicate directly with the printer corresponding to the clicked icon (S13: YES), then goes to S1, wherein the browser computer G displays the printer screen 200a of the printer corresponding to the clicked icon 301, as shown in FIG. 7 .

Figure 7:
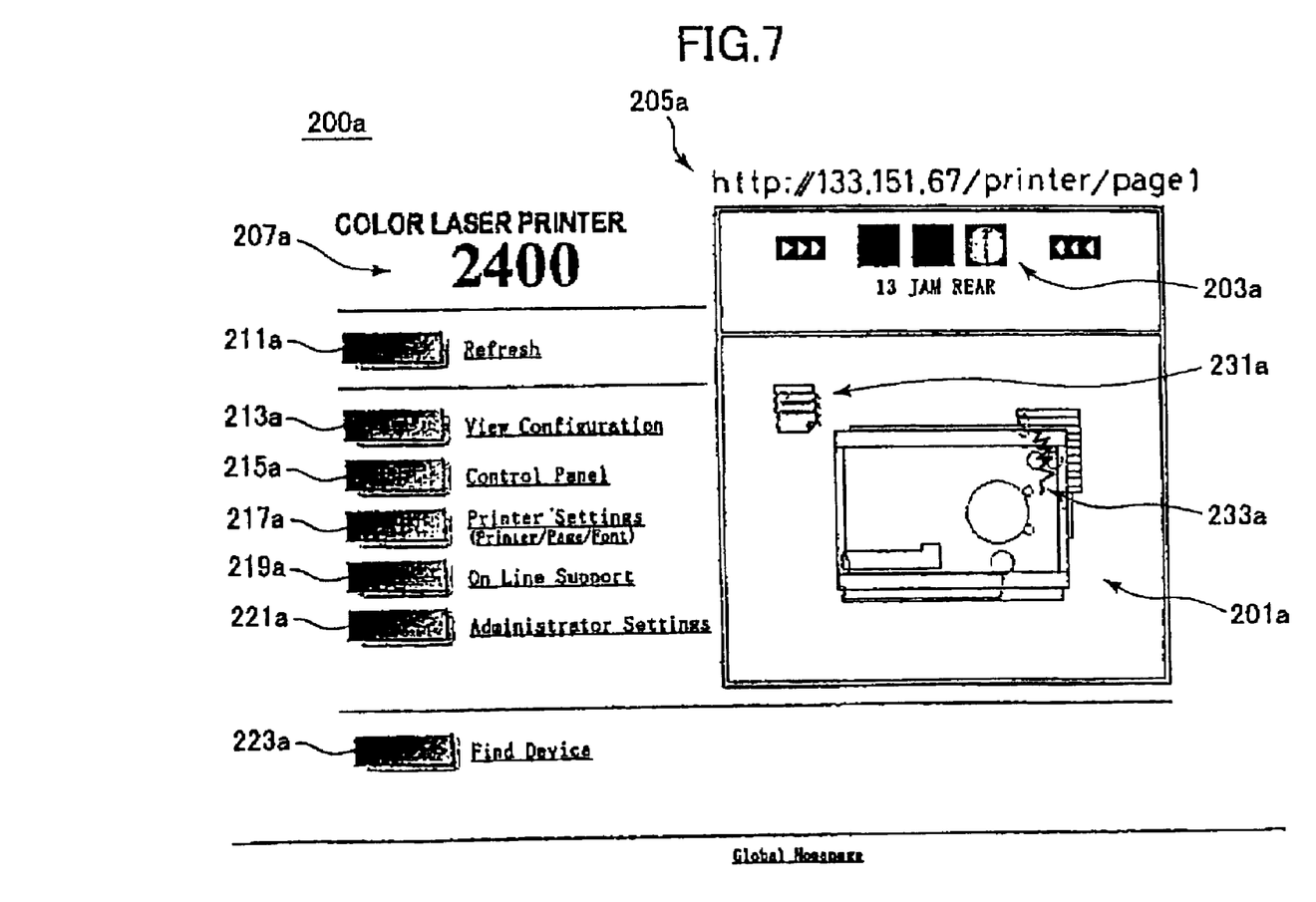
FIG. 7 is a view showing another display screen of the browsing computer.

Referring to FIG. 7, the printer screen 200a is substantially the same as the printer screen 200 shown in FIG. 5. Therefore, similar components will be described with the same reference numbers appended with "a," and their detailed description will be omitted. The printer screen 200a includes a picture 231a indicating that a paper jam has occurred and a blinking portion 233a indicating the position of the paper jam in an image 201a. If a paper jam occurs, the pilot lamp 203a is illuminated in red. Thus, the printer screen 200a indicates conditions of the displayed printer.

As described above, in order to display the printer screen 200, the browser computer G transmits a status information request to the printer on which the browser computer G attempts to obtain current information, and receive the HTML file related to the current information. However, direct communication between the browser computer G and the printer corresponding to the icon 301 clicked in S9 is sometimes prohibited by the gateway 56 due to the restricted settings of the IF addresses. In this embodiment, the browser computer G determines in S13 following S9 whether the browser computer G is allowed to communicate the printer corresponding to the clicked icon 301 directly. If the direct communication is possible (S13: YES), then goes to S1, wherein the browser computer G displays the printer screen 200a corresponding to the clicked icon. However, if the direct communication is not established (S13: NO), the browser computer G is not allowed to send the status information request directly to the printer. The process then goes to S15, wherein the browsing computer G displays a printer setting screen 400 shown in FIG. 8.

Figure 8:
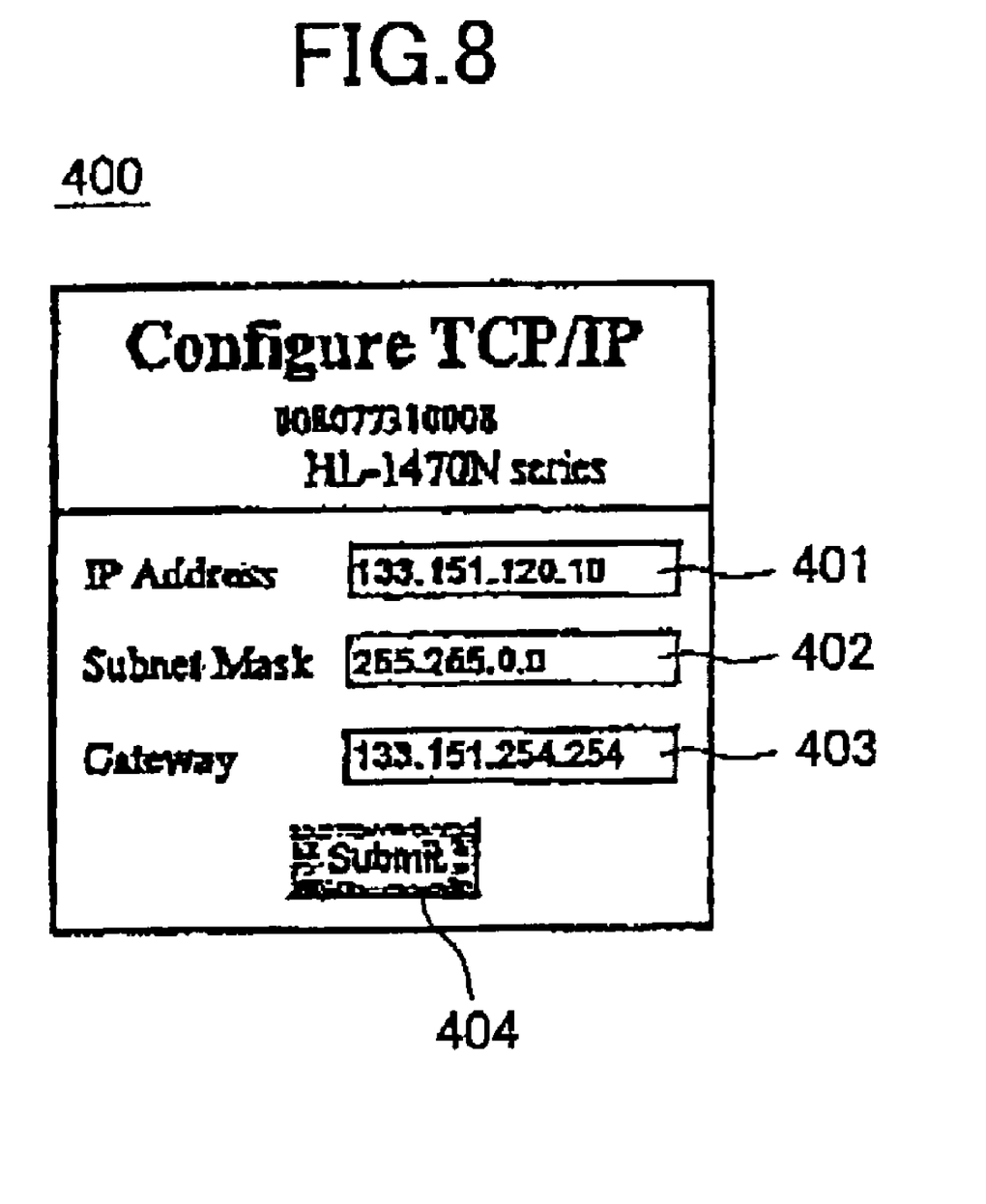
FIG. 8 is a view showing a printer setting screen of the browsing computer.

Referring to FIG. 8 the printer setting screen 400 includes an input box 401 for an IF address and an input box 402 for the subnet mask of the printer corresponding to the icon clicked in S9, and an input box 403 for the gateway 56. The printer setting screen 400 is for changing settings such as the IP address and subnet mask numbers of the printer designated by the clicked icon in S9 and for changing settings of the gateway connected to the browser computer G. The printer setting screen 400 also includes a submit button 404.

After a user enters an IF address number, a subnet mask number, and a gateway number into the input boxes 401, 402, 403, the user clicks the submit button 404 to change the settings of the printer and the gateway settings. The numbers of the IP address and the subnet mask of the printer are then changed to desired values. At the same timer the gateway settings are changed to desired values, too. When the browser computer G displays the printer setting screen 400, the user can enter setting information such as proper IP address for the printer, and click the submit button 404 to change the printer IP address to another IP address by which the browser computer G is allowed to establish direct communication with the printer corresponding to the clicked icon in S9.

The more detailed description for changing the printer settings will be made as follows. In S17 following S15, the browser computer G determines whether the submit button 404 is clicked The browsing computer G waits for the click of the submit button 404 while performing the other operations such as displaying numbers entered by the keyboard 54 in S19. When the browser computer G determines that the submit button 404 is clicked (S17: YES), then the browser computer G submits the settings information such as an IP address and a subnet mask number to the printer 10 using HTTP in S21.

On the other hand, when the printer 10 receives the settings information from the browser computer G, the printer 10 determines that a request for changing the settings of another printer 30 or 40 are received (S42: YES). The printer 10 then transmits the designated SNMP packet to the designated printer in S51. In this embodiment, the designated SNMP includes the settings information. It should be noted that the designated printer is selected by the clicked icon in S9 on the find device screen 300 of the browser computer G.

If any trouble does not occur in the system, the designated printer can obtain the changed IP address, which enables the browser computer G to transmit a status information request to the designated printer directly. Therefore, the browser computer G can display a printer screen 200 of the designated printer in S1.

In S52 following S51, the printer 10 determines whether the settings of the designated printer are changed successfully. If so (S52: YES), then goes to S53, wherein the printer 10 creates a "successful" screen in HTML for the browser computer G. If not (S52: NO), then goes to S54, wherein the printer 10 creates an "error" screen in HTML. In either case, the process then goes to S45, wherein the printer 10 sends the HTML file created in S53 or S54 to the browser computer G, and returns to the loop processes of S41 to S43.

Figure 9:
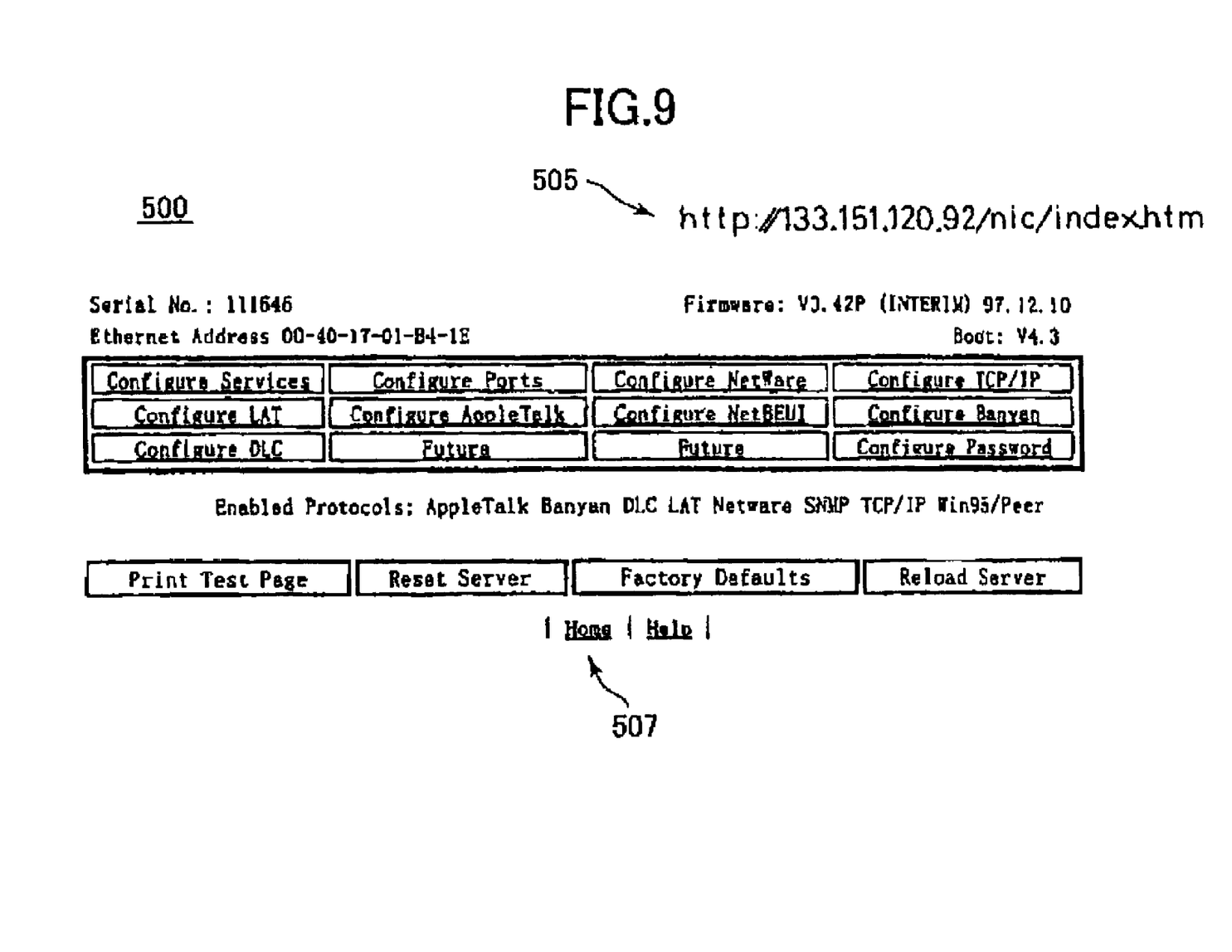
FIG. 9 is a view showing a NIC information screen of the browsing computer.

Referring to FIG. 2 again, when the browser computer G determines that the administrator setting button 221, or 221a is clicked on the printer screen 200 or 200a in S5, then goes to S23, wherein the browser computer G displays an NIC information screen 500, as shown in FIG. 9. The NIC information screen 500 includes information on the NIC 1. The browser computer G performs update of firmware and various processes such as environment settings for the NIC 1 through the NIC information screen 500. The NIC information screen 500 includes the URL display 505 of the NIC 1 and a "Home" button 507 for returning to the printer screen 200 below the URL display 505.

Next, in S25 following S23, the browser computer G determines whether the home button 507 is clicked. When the home button 507 is clicked (S25: YES), then returns to S1, wherein the browser computer G displays the printer screen 200 or 200a. If the home button 507 is not clicked (S25: NO), other processes such as update of firmware are performed. And then the routine returns to S25. When other buttons 211-221, 211a-211a are determined to be clicked in S5, the program proceeds to S29. In S29, other processes corresponding to the clicked button are performed. The browsing computer G waits for the next click of a button in S3.

As described above, in this embodiment, the printer 10 obtains information on another printer connected to the network W over the network W. The printer 10 can transfer the obtained information along with its own information to the browser computer G. For this reason, the browser computer G only needs to retrieve information from a single printer 10 in order to obtain information on any printers connected to the network W.

In this network system, the browser computer G just transfers settings information to another printer through the printer directly communicating with the browser computer to change the IP address of the printer. That is, even if the browser computer G does not establish direct communication with a printer in order to send setting information to the printer, the browser computer G can send the setting information indirectly to the printer through the printer directly communicating with the browser computer G.

Even if the printer 30 or 40 has an IP address for prohibiting direct communication between the browser computer and the printer 30 or 40, the browser computer G can change the IP address of the printer 30 or 40 to establish direct communication between the browser computer G and the printer 30 or 40. Accordingly, the network system enjoys enhanced convenience. In addition, a disperse database can be easily established, because the browser computer can indirectly send any command or instruction to any printer connected to the network.

While the invention has been described in detail with reference to specific embodiments thereof, it would be apparent to those skilled in the art that various changes and modifications may be made therein without departing from the spirit of the invention, the scope of which is defined by the attached claims.

For example, the same network system can be configured using a firewall instead of the gateway 56.

Also, in the embodiment, the routine returns directly to S1 after the browser computer transmits the settings information to the printer 10 in S21. However, the routine can be modified to return to S13 instead. In this case, if change of the IP address to the printer 30 or 40 fails (S52: NO), or if a user makes an input mistake to sets a wrong IP address that is blocked by the gateway 56, the determination in S13 results that direct communication is impossible. The browser computer G then displays the printer setting screen 400 again in S15.

The embodiment describes commands for setting the IP address to predetermined values as examples of control commands indirectly sending to the printers 30, 40 through the printer 10. However, the present invention is not limited to the described embodiment. The browser computer G may send another control commands for setting other setting information. Also, control commands that indirectly indicate an actual operation such as the number of copies to be printed or a start/stop print are acceptable. In these cases, different screens, such as a screen for inputting the desired number of copies to print is displayed on the CRT of the browser computer.

In another embodiment, a printer having no web server program may be connected to the network W. Such a printer is not usually allowed to communicate directly with the browser computer G even if its IP address is changed. In this case, control commands transmitted from the browser computer G is transmitted to the printer 30 or 40 after being converted from HTTP to SNMP by the SNMP client program 6b or the SNMP server program 6c. In this case, the data converted from HTTP to SNMP is sent to the printer 30 or 40 in S21 of FIG. 2. With this configuration, control commands transferred by the browser computer G can be received even by a printer having no web server program 6a. Therefore, the network system can obtains enhanced convenience.

In this case, it should be noted that the browser computer G and the printer 30, 40 cannot communicate with each other directly, so that control commands is always transmitted indirectly through the printer 10 or a printer that has the same functions as the printer 10.

When a printer that cannot communicate directly with the browser computer G is required to communicate with the browser computer G, the printer can search for another printer having the web server program 6a, and ask that printer to intercede in communication with the browser computer G.

The program represented in FIG. 4 can be stored on any kinds of memory media instead of ROM or RAM. For example, the program can be stored on a CD-ROM, a flexible disk, a magnetic disk, a hard disk, or a file server on the Internet. Further, the present invention is not limited to use in a printer system, but could be applied to a different network system such as a transmission karaoke system.

Further, the embodiment describes determining whether another printer is made by the same manufacturer as the printer communicating with the browser computer directly by inserting a keyword such as a trademark of the printer in the printer's response to the information request transmitted in S91 of FIG. 4. However, this determination can be made by including an OID (object ID) that can be responded by only printers from the same manufacturer in S91. That is, because an error signal indicating that responds to the OID is not possible will be received from printers other than those made by the same manufacturer, so it may be easy to determine which printer is made by the same manufacturer.

What is claimed is:

1. A network system comprising:
   a plurality of network terminals connected to a network, each of the plurality of network terminals having an IP address different from one another; and
   an administrator terminal connected to the network to manage the plurality of network terminals; and
   a gateway, provided between the network and the administrator terminal, for restricting direct communication between the administrator terminal and the plurality of network terminals and allowing the administrator terminal to directly communicate with one of the plurality of network terminals, wherein
   the administrator terminal includes:
      a finding unit that causes the one of the plurality of network terminals to research information as to another of the plurality of network terminals that is capable of communicating directly with the one of the plurality of network terminals;
      a determination unit that determines based on the information whether the another of the plurality of network terminals has a first IP address that is allowed by the gateway to directly communicate with the administrator terminal;
      a transmission unit that transmits a command to the one of the plurality of network terminals, the command being for changing an IP address of the another of the plurality of network terminals to a different IP address that is allowed by the gateway to directly communicate with the administrator terminal, if the determination unit determines that the another of the plurality of network terminals does not have the first IP address; and
      a direct communication unit that establishes direct communication with the another of the plurality of network terminals, if the determination unit determines that the another of the plurality of network terminals has the first IP address, and
   the one of the plurality of network terminals includes:
      a command receiver that receives the command from the administrator terminal over the network; and
      a command transmitter that transmits the command received by the command receiver to the another of the plurality of network terminals.

2. A network system as claimed in claim 1, wherein the one of the plurality of network terminals includes a protocol changing unit that changes protocol defining the command, and wherein if the protocol of the command received by the command receiver is not supported by the another of the plurality of network terminals, the protocol changing unit changes the protocol of the command to a different protocol that supports the another of the plurality of network terminals, and the command transmitter then transmits the command in the different protocol to the another of the plurality of network terminals.

3. A network system as claimed in claim 1, further comprising:
   an interface interconnecting the network and the one of the plurality of network terminals;
   the administrator terminal further including an interface information obtaining means for obtaining information on the interface therefrom when the one of the plurality of network terminals transmits information on all of the plurality of network terminals to the administrator terminal.

4. A network system as claimed in claim 3, wherein the administrator terminal further includes a setting changing means for changing a setting or settings of either of the interface and the one of the plurality of network terminals transmitting the information to the administrator terminal.

5. A network system as claimed in claim 1, wherein the one of the plurality of network terminals further includes a memory for storing information on all of the plurality of network terminals.

6. The network system as claimed in claim 1, wherein the administrator terminal comprises a display device that displays information about the network terminals with which the administrator terminal is directly or indirectly communicable, the display device further displaying an input window for changing an indirectly communicable network terminal to a directly communicable network terminal to enable the administrator terminal to establish direct communication with a network terminal changed to be directly communicable through the input window.

7. A method for managing a plurality of network terminals connected to a network by an administrator terminal, each of the plurality of terminals having an IP address different from one another, the administrator terminal being connected through a gateway to the network, the gateway restricting direct communication between the administrator terminal and the plurality of network terminals and allowing the administrator terminal to directly communicate with one of the plurality of network terminals, comprising the steps of:

searching information as to another of the plurality of network terminals that is capable of communicating directly with the one of the plurality of network terminals;

determining based on the information whether the another of the plurality of network terminals has a first IP address that is allowed by the gateway to directly communicate with the administrator terminal; and     transmitting a command from the administrator terminal through the one of the plurality of network terminals to the another of the plurality of network terminals, the command being for changing an IP address of the another of the plurality of network terminals to a different IP address that allows the administrator terminal to directly communicate with the another of the plurality of network terminals, if it is determined that the another of the plurality of network terminals does not have the first IP address.

8. A method as claimed in claim 7, further comprising the steps of:

changing protocol defining the command to a different protocol supporting the another of the plurality of network terminals, and     transmitting the command in the changed protocol to the another of the plurality of network terminals.

9. A storage medium storing a set of program instructions executable on a data processing device and usable for managing a plurality of network terminals connected to a network by an administrator terminal, each of the plurality of network terminals having an IP address different from one another, the administrator terminal being connected through a gateway to the network, the gateway restricting direct communication between the administrator terminal and the plurality of network terminals and allowing the administrator terminal to communicate directly with one of the plurality of network terminals, the instructions comprising:

instructions for searching information as to another of the plurality of network terminals that is capable of communicating directly with the one of the plurality of network terminals;

instructions for determining based on the information whether the another of the plurality of network terminals has a first IP address that is capable of communicating directly with the administrator terminal; and     instructions for transmitting a command from the administrator terminal through the one of the plurality of network terminals to the another of the plurality of network terminals, the command being for changing an IP address of the another of the plurality of network terminals to a different IP address that allows the administrator terminal to establish direct communication with the another of the plurality of network terminals, if it is determined that the another of the plurality of network terminals does not have the first IP address.

10. A storage medium as claimed in claim 9, further comprising:

instructions for changing protocol defining the command to a different protocol supporting the another of the plurality of network terminals, and     instructions for transmitting the command in the changed protocol to the another of the plurality of network terminals.

\* \* \* \* \*